United States Patent
Yannone et al.

(10) Patent No.: US 7,132,961 B2
(45) Date of Patent: *Nov. 7, 2006

(54) PASSIVE RF, SINGLE FIGHTER AIRCRAFT MULTIFUNCTION APERTURE SENSOR, AIR TO AIR GEOLOCATION

(75) Inventors: Ronald M. Yannone, Nashua, NH (US); Kam U. Mun, Litchfield, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 119 days.

This patent is subject to a terminal disclaimer.

(21) Appl. No.: 10/937,417

(22) Filed: Sep. 9, 2004

(65) Prior Publication Data

US 2005/0110661 A1     May 26, 2005

Related U.S. Application Data

(63) Continuation-in-part of application No. 10/217,024, filed on Aug. 12, 2002, now Pat. No. 6,822,583.

(51) Int. Cl.
  *G08G 5/04* (2006.01)
(52) U.S. Cl. ............... 340/961; 340/945; 701/223
(58) Field of Classification Search ........ 340/961, 340/945; 701/176, 223; 702/5
See application file for complete search history.

(56) References Cited

U.S. PATENT DOCUMENTS

| | | | |
|---|---|---|---|
| 5,208,757 A | * 5/1993 | Appriou et al. | 701/223 |
| 5,408,541 A | 4/1995 | Sewell | |
| 5,838,262 A | * 11/1998 | Kershner et al. | 340/945 |
| 6,043,867 A | 3/2000 | Saban | |
| 6,484,101 B1 | * 11/2002 | Lucas et al. | 702/5 |
| 6,487,519 B1 | * 11/2002 | O'Neill et al. | 702/176 |
| 6,822,583 B1 | * 11/2004 | Yannone et al. | 340/945 |

* cited by examiner

*Primary Examiner*—John Tweel, Jr.
(74) *Attorney, Agent, or Firm*—Malin, Haley & DiMaggio, P.A.

(57) ABSTRACT

A method and system to rapidly, passively, range and track maneuvering airborne emitters (enemy targets and threats) for tactical fighters using batch based recursive estimators for track initialization and track maintenance that includes providing information processing that has angle and signal amplitude data, threat database, and feedback from pilot cue analysis. The system includes pilot cue analysis which computes airborne emitter (target and threat) heading and corresponding accuracy to determine if sufficient accuracy is available to present the pilot with proper pilot cue options. The first stage is a range bank also called a compound parallel hypothesis evaluator and the second stage is an interactive multi-model. Both stages provide for the output of the algorithm to be a range measurement and an associated confidence factor. The algorithm inputs azimuth angle elevation angle and range and is capable of inputting data from three different data pre-processors (i.e., sensor data fusion).

2 Claims, 3 Drawing Sheets

PASSIVE RF, SINGLE FIGHTER AIRCRAFT MULTIFUNCTION APERTURE SENSOR, AIR TO AIR GEOLOCATION

This application is a continuation-in-part of U.S. application Ser. No. 10/217,024 filed Aug. 12, 2002 that has issued into U.S. Pat. No. 6,822,583.

BACKGROUND OF THE INVENTION

1. Field of the Invention

The present invention relates generally to aircraft such as tactical fighter aircraft that can employ passive technology for early target detection and target tracking, and specifically to an improved method and system that enhances the. implementation of tactical fighter configuration data and sensor assets for maneuvering or non-maneuvering airborne RF emitters, which represent targets or threats, to enhance the tactical fighter's ability to either avoid or intercept and destroy targets.

Using only a fighter aircraft's passive RF multifunction aperture azimuth measurements along with prescribed fighter aircraft maneuvers, the invention provides an ability to meet passive geolocation quality performance against an active airborne RF emitter (threat. or target). Geolocation involves estimating the target's state vector and error covariance which basically includes range, speed, heading azimuth and elevation.

2. Description of Related Art

Modern warfare requires the airborne defense of military and civilian targets, typically by tactical fighters, whose job is to seek out and destroy incoming enemy aircraft seeking to destroy friendly military and civilian complexes, whether on ground or at sea. At the current speeds and aircraft stealth configurations of potential target aircraft, there exists a critical need for rapid but accurate passive range target speed and heading estimates in order to prioritize incoming aircraft threats, avoid them, and possibly target them. The complex problem provides for a total integration of all of the tactical fighter's onboard and remote assets. The entire weapon system, which includes remote support help with communications and radar, must be completely integrated and used with all the on board aircraft equipment, including ownship and wingmen systems to maximize the ability of the tactical fighter to destroy enemy targets.

A very important aspect of current warfare for airborne weapon systems is to employ passive systems to avoid detection by the oncoming targets. It is felt that current systems based on onboard ownship weapons and information systems have not utilized bootstrap capability of an entire weapon system that. incorporates all of the tactical fighter's on board assets in addition to the remote assets. The prior art shows in U.S. Pat. No. 5,408,541 issued Apr. 18, 1995, a method and system for recognizing targets at long ranges. One of the drawbacks of the system described in this patent is the fact that the system is not completely passive, and does not take advantage of all of the weapon system assets available.

U.S. Pat. No. 6,043,867 issued Mar. 28, 2002, shows a tracking system that includes an apparatus and process for early target detection that uses the passive infrared tracking capability of infrared radiation emitted from a flying target and for generating a succession of line-of-sight (LOS) or LOS rate signals that are stored in a database. The electromagnetic finder in the system is configured to operate at first detection threshold for receiving relatively low magnitude reflections. Estimations are made of LOS and first-stage data, facilitating early steering of the interceptor for dually homing onto the target. Again, there is no bootstrapping of the entire ownship system capabilities to solve the overall problem.

The successful operation and maneuvering of a tactical fighter in an actual battle scenario places a tremendous amount of work on the pilot and flight crews to accomplish a successful operation, intercepting and destroying an enemy bomber or fighter. In addition to the safe operational management of the aircraft itself, there is the requirement of a continuous and instantaneous situational awareness of the threat environment, and especially the early warning detection of targets or potential targets to allow ownship and wingmen to achieve either target avoidance or interception and weapon deployment passively in the most efficient and potentially successful intercept. In today's weapons environment, it is also a requirement that ownship and wingmen typically are in a passive mode to avoid detection themselves from the incoming targets.

Thus, each tactical fighter, which often includes two aircraft, ownship, and wingmen, have configuration data and sensor assets which can be used for passively initializing potential target tracks and provide passive range estimates of estimated quality for these initialized tracks and to sustain or maintain or drop the tracks, whether it be for maneuvering or non-maneuvering incoming airborne RF emitters, which could be either threats or real targets.

The present invention provides for a solution of this problem, which includes providing a method and system for a flyable airborne emitter (target) location solution in the cockpit by bootstrapping batch maximum likelihood (ML), probabilistic data association filter (PDAF), and recursive interacting multiple model (IMM) methodologies that use 1) noisy electronic warfare (EW), 2) interferometer measurements, such as the cosine of cone angle, 3) pulse descriptor word (PDW) data, 4) priority mission data, 5) real time mission constraints, and 6) available real time track information from other on board avionics and off board information sources. By utilizing the present invention, the entire weapon system on board ownship and wingmen abilities are enhanced to attain the most rapid and accurate passive range estimates.

The present invention involves the enhancement and modification in order to bootstrap the approach presented in IEEE paper entitled "Bearings—Only Tracking of Maneuvering Targets Using a Batch Recursive Estimator," published in IEEE *Transactions On Aerospace And Electronic Systems*, Volume 37, No. 3, July 2001. The information presented in this article is incorporated into this patent application by reference. The paper approach describes a batch recursive estimator for tracking maneuvering targets from bearings-only measurements in clutter, such as low signal-to-noise ratio targets. The approach was used to combine batch maximum likelihood probabilistic data association (ML-PDA) estimator with the recursive interacting multiple model (IMM) estimator with probabilistic data association (PDA) to result in better tracking initialization, as well as track maintenance results in the presence of clutter. The methodology describes also how batch recursive estimator can be used for adaptive decisions for ownship maneuvers based on target state estimation to enhance target observability.

The present invention provides a method and system that can bootstrap the approach presented in this article to greatly enhance passive range convergence. The present invention also deals with the inner workings of the interacting multiple model.

The high level block diagram defining the IEEE AES paper is shown in FIG. 1. The methodology discloses track initialization (maximum likelihood probabilistic data association filter) and track maintenance (interacting multiple model PDAF with amplitude information) pieces. The real time measurement inputs are noisy angle measurements and signal amplitude. The output is a range estimate and quality factor. This approach will be limited and range conversion slow. The IEEE AES paper approach does make for an excellent basis to develop the invention by bootstrapping architecture as described below. When looking at FIG. 1, the IEEE AES paper approach shows angle and signal amplitude data, which is fed to a track initialization and track maintenance data. The final result is range estimate and quality factor. One of the limitations is that in the IEEE AES paper, only the angle and signal amplitude data are used. The internal design parameters are fixed, so no real time adaptive capability is available.

In current tactical fighter aircraft, for pilot situational awareness, there are various pilot cue analyses that are provided in the form of heads-up display and other cockpit information devices that clearly show numerous variables to the pilot concerning the status of the aircraft and the attitude. Using the pilot cue analysis and the information given to the pilot, both in ownship and wingmen, with the present invention, an entire mission system's functionality can be provided that takes advantage of all the information available to ownship.

This invention provides the innovative use of the interacting multiple model (IMM) Kalman filter-based algorithm in two stages. The ability to meet passive geolocation quality performance against an active airborne emitter (target) using only fighter aircraft passive RF multifunction aperture azimuth measurements along with the prescribed fighter aircraft maneuvers is achieved. The geolocation involves estimating the target state vector and error covariance. Stage one includes monitoring the measurement residuals by processing measured multifunction aperture (MFA) azimuth and elevation when available data over a set of candidate initial state vectors to weed out improbable geolocation solutions (and converge to the most likely) to effectively initialize the Kalman filter state vector. In stage two, the invention continues processing the subsequent angle measurements in the two-model interactive multiple model whereby the airborne target dynamics are modeled as (1) straight (i.e., constant speed and heading) and (2) undergoing maneuver (i.e., heading change) over a brief period of time. The present invention then overall enhances a tactical fighter aircraft's ability to intercept and destroy incoming targets.

SUMMARY OF THE INVENTION

A method and system for a tactical fighter aircraft to enhance target interception and early detection that uses the tactical fighter configuration data and sensor assets for passively initializing target tracks to provide passive target range estimates of estimated quality for their tracks and to maintain or drop tracks for any maneuvering or non-maneuvering airborne RF emitter representing targets or threats, resulting in rapid, accurate, passive range estimates for threat prioritization that incorporates all of the tactical fighter assets available for the problem's solution.

The method includes providing and establishing a threat database that includes providing information processing for receiving angle and signal amplitude data to the target, relevant ownship data, inertial data of ownship, and feedback from the pilot cue analysis. The output of the information processing includes the ML-PDAF track initialization generator that is based on the IEEE article. The information processing also has an output that includes feed forward path and an output that goes to the pilot cue analysis.

The entire system provided includes and interacts with an overall tactical fighter platform mission system function that is integrated into the total operation of the aircraft.

The track initialization data output goes to the IMMP-DAFAI track maintenance system that itself has a feedback provision. The information processor also has a feed forward path into the IMMPDAFAI. The IMMPDAFAI has an output of range estimate and quality factor that is also outputted to the pilot cue analysis and to the tactical fighter mission platform functions with the aircraft.

The present methodology utilizes a pilot cue analysis that receives information from the information processing unit and, in turn, provides pilot cues for rapid and continuous situational awareness, which could include G-levels, ±two-turn or sinusoid, two heading values, and two time values. The pilot cues are used for setting up tracking for early detection of targets that can relate to ownship course, heading, and speed through initial maneuvering by ownship.

By bootstrapping and implementing the IEEE-AES process described for target tracking, the present invention provides an enormous amount of information available at ownship and analysis for enhancing the problem's solution.

For example, the information processing unit will get ownship inertial data that includes the tactical fighter's speed, heading, RCS contour map, IR/EO contour map, flap motion tables, G-level, aperture locations, and bank angle. The information processing unit will also receive the threat database and angle and signal amplitude data, representative of what target information is available.

The pilot cue analysis receives outputs from the track maintenance and from the information processing unit to provide pilot cues that are critical in terms of evaluation, early detection, and tracking passively the early detected targets.

The information processing unit and function will incorporate multiple aircraft angle and RF pulse descriptor word measurements via the intra/inter flight data link. These data will be used to correlate the angle information and compute the course estimates of range to the target emitter from ownship aircraft, along with the wingmen, along with a computed accuracy value via closed form two ship ranging expressions. This would be using interferometer angle measurement accuracy, the base leg separating the ownship from wingmen, and the angle measurements.

The tactical fighter mission system's platform receives a request from the information processing unit for any available range information to the target from any other remote or off board source outside of the ownship tactical aircraft, even if information is related to other platforms or satellite assets.

The information processing also can request from the mission system-of the tactical fighter function any other data that could result in incorporating into the information processor more accurate on board infrared (IR) angle measurements and their amplitude data by correlating this data with the EW RF measurements to feed the ML-PDAF. This would enhance convergence of range estimates by using sub milli radium measurement accuracy, as well as the airborne emitter heading (target) and velocity estimates and as feed forward information to the pilot cue function. The information processing unit includes a feed forward path to the pilot cue analysis processor and a feedback path back to the information processor.

The information processing unit also can augment very rough, coarse, range estimates, such as a range "no further than" by using known threat airborne target (emitter) RF mode transitions, such as acquisition-to-track, the ownship RCS presented to the emitter at the angle measured, the particular AI (airborne emitter) ratio of known range to the fourth root of a known RCS of the ownship.

The information processing unit also feeds ML-PDAF emitter signals PDWSNR (signal-to-noise ratio) estimate to assist track formation and feed forward the SNR to the IMMPDAFAI for track maintenance.

The information processing unit utilizes on board stored data files regarding the airborne platform identification, such as the anticipated target, type of aircraft belonging to the enemy, the target emitter identification, such as a certain type of enemy radar, known weapons that the target could be carrying, the lethal envelope and the tactical deployment, which all can aid in range inferencing and threat prioritization and pilot cues.

The information processing unit also modifies IMM parameters based on real time data and mission related information, such as adding adaptivity to the model switching transition priorities, process noise (Q-matrix) levels for the individual airborne emitter platform dynamics models, measurement error covariance (R-matrix) values, sample interval values (T) used, probability of detection parameter (PD), the number of data points used in the batch ML (maximum likelihood) track initialization segment, and forecast the tracks of the target (extrapolate their position in inertial space and increase their corresponding uncertainty) when the measurements are known to be unavailable as in ownship maneuvers that place the airborne emitter outside the interferometer field of view by feeding the forward FOV issue to the IMMPDAFAI function where the Kalman filter banks are located.

In summary, the information processing unit and the algorithms used therein form the basis for implementing the MLPDAF track initialization and the IMMPDAFAI track maintenance processing discussed in the IEEE-AES approach.

The second major processor used in the present invention is a pilot cue analysis, which provides cues to the pilot to implement early detection and maneuvering to identify as soon as possible enemy targets. The pilot cue analysis computes the target airborne emitter heading and corresponding accuracy to determine if there is sufficient accuracy available to present the pilot in ownship with proper pilot cue options. Such pilot cue options would include ownship maneuver type, G-level, initial ownship heading and, when applicable, the two heading angles and straight leg duration. The purpose of ownship maneuvers is to provide profiles that aid in early detection of the target and aid in providing track initialization from different perspectives of ownship. The ownship maneuvers considered so far as part of the invention are the two turn and sinusoidal flight paths. The two turn ownship maneuver consists of two 90 degree turns in tandem with opposite sign such that when completed, end with ownship flying in the same heading as when it started the maneuver. The second ownship maneuver is the sinusoid with several variants. It is defined by the algorithm to include two heading angles and two straight leg time values. The first heading angle veers ownship off its original course, and then the ownship flies straight for a number of seconds to be determined. The second heading angle is prescribed to turn the ownship in the opposite direction, across its original heading line. The second time value, which is to be determined, of an indicated duration of subsequent straight legs the ownship needs to fly. If insufficient accuracy in heading exists, feedback is connected into the tactical fighter mission system's function platform and feedback to the information processing unit to indicate that more time is needed and that if another sensor asset can be assigned to aid heading accuracy, that the system should do so. The sensor assets include off board sources that the mission system can utilize either through a request or possible control. This closed loop architecture is an important ingredient in the invention.

Thus, utilizing the present invention by bootstrapping the original track initialization and track maintenance described in ML-PDAF and IMMPDAFAI, the present invention provides a method and system that utilizes and includes information processing and pilot cue analyses that are tied into the tactical fighter mission system's platform that provides to the pilot the maximum amount of synergism from all of the different information sources available on ownship in order to get line-of-sight angles and range estimates for airborne emitter targets in a passive environment for ownship amidst a low signal-to-noise ratio environment.

In the present invention, the core component of both stages described above is the Kalman filter. The Kalman filter is a set of equations that use a predictor-corrector algorithm to estimate the highest probability state by minimizing the estimated error covariance. The Kalman filter was initially used in navigation but has been expanded to other domains with the emergence of high speed digital computers. It is important in discussing the present invention the air to air emitter location algorithm to provide a brief discussion of a Kalman filter.

Kalman Filter

The Kalman filter is used to estimate the range of an airborne emitter based on azimuth (angle), elevation (angle) and rough range (meters) measurements.

There are two models used in the Kalman filter: (1) A time update predictor and (2) a measurement update (corrector model). The time update/predictor model outputs of a priori estimates for the state and the air, $X_p$ and $P_p$, respectively. The measurement update corrector model output measured updates for the state, air and Kalman feedback, $X_m$, $P_m$ and K, respectively.

For our purposes we used the Kalman Filter to estimate the range of an airborne emitter based on azimuth (angle), elevation(angle) and rough range (meters) measurements. This will be described in more detail later.

An excellent introductory paper on Kalman Filters can be found at the web address:

http://www.cs.unc.edu/~welch/kalman/kalman_filter/kalman.h tml

There are two "model" used in the Kalman Filter; a Time Update (Predictor) and a Measurement Update (Corrector) model. The Time Update/Predictor model outputs a priori estimates for the state and the error, $X_p$ and $P_p$ respectively. The Measurement Update (Corrector) model outputs measured updates for the State, Error, and Kalman Feedback, $X_m$, $P_m$, and K respectively. FIG. 3 is a simple diagram showing the interaction between the different models. Unless otherwise stated, these calculations are performed in the Matlab programs KalmanInnerLoop.m for Stage 1 and KalmanIMMInner.m for Stage 2. The Kalman filter being described is a 6 stage design. North, North Velocity, East, East Velocity, Down, Down Velocity.

[n ṅ e ė d ḋ]

This allows us to determine location and velocity information about the emitter. Emitter acceleration could not be determined from this algorithm. To measure acceleration would require 3 more states (for North, East and Down Acceleration). Additionally, it would require the ownship to make an accelerating maneuver to properly characterize the emitter, this is normally avoided for a variety of reasons discussed.

Time Update/Predictor Model

As previously mentioned, there are two equations in the Time Update/Predictor Model, the State Estimate (also called the Time Propagated State Estimate) and the State Error. The a priori estimate of the Kalman state (or predicted Kalman state) is defined as $$X_p = \Phi X_m + U_{oc} \quad \text{(Equation 2.1)}$$

where $\Phi$ is the State Transition Matrix. For our system it is represented as the 6×6 matrix (calculated in getPHI.m):

$$\Phi = \begin{bmatrix} 1 & T & 0 & 0 & 0 & 0 \\ 0 & 1 & T & 0 & 0 & 0 \\ 0 & 0 & 1 & T & 0 & 0 \\ 0 & 0 & 0 & 1 & T & 0 \\ 0 & 0 & 0 & 0 & 1 & T \\ 0 & 0 & 0 & 0 & 0 & 1 \end{bmatrix} \quad \text{(Equation 2.2)}$$

Where T=time since the last measurement

The matrix $\Phi$ is considered constant because we assume a constant velocity and heading for the emitter.

$$U_{oc} = \begin{bmatrix} n_{own}(t-1) - n_{own}(t) + \dot{n}_{own}(t-1)T \\ \dot{n}_{own}(t-1) - \dot{n}_{own}(t) \\ e_{own}(t-1) - e_{own}(t) + \dot{e}_{own}(t-1)T \\ \dot{e}_{own}(t-1) - \dot{e}_{own}(t) \\ d_{own}(t-1) - d_{own}(t) + \dot{d}_{own}(t-1)T \\ \dot{d}_{own}(t-1) - \dot{d}_{own}(t) \end{bmatrix} \quad \text{(Equation 2.3)}$$

Where T is the time between samples t−1 and t.

The vector $U_{oc}$ (called OwnCorr in the scripts, refer to GetOwnCorr.m) is the ownship correction vector or discrete time forcing function for the time update equation in the Kalman filter. The ownship correction vector is driven by the ownship acceleration.

The second a priori (time update/predictor) equation is for $P_p$, the predicted state error covariance matrix.

$$P_p = \Phi P_m \Phi' + Q \quad \text{(Equation 2.4)}$$

Where $\Phi$ is the State Transition Matrix described in Equation 2.2

$\Phi'$ is the transpose of the Stage Transition Matrix

Q is the Process Noise Covariance Matrix defined below (calculated in getQ.m):

$$Q = \begin{bmatrix} \frac{q}{k} & 0 & 0 & 0 & 0 & 0 \\ 0 & q & 0 & 0 & 0 & 0 \\ 0 & 0 & \frac{q}{k} & 0 & 0 & 0 \\ 0 & 0 & 0 & q & 0 & 0 \\ 0 & 0 & 0 & 0 & \frac{q}{k} & 0 \\ 0 & 0 & 0 & 0 & 0 & q \end{bmatrix} \quad \text{(Equation 2.5)}$$

Where q is a user input to control the speed with which the filter reacts to measured data and k is a constant, currently 100000.

Our analysis indicates that in most cases (if not all) the best value for q is 0, given a non-maneuvering emitter. This of course would make all elements of Q equal to 0. The measured state error covariance matrix would then reduce to $P_p = \Phi P_m \Phi'$. Which says that the predicted estimate of P, $P_p$, is based on the Measured State Error Covariance Matrix ($P_m$), not on model noise. The Second Stage of the Algorithm uses a non-zero matrix Q for one of the 2 models, this is to account for the fact that most emitters make a maneuver, at some point.

Measurement Update/Corrector Model

In addition to the a priori/predicted variables $X_p$ and $P_p$ there are values based on the incoming measurements. These are K, $P_m$, and $X_m$, the Kalman Gain, Measured State Error Covariance, and Measured State respectively.

The Kalman Gain, K, is defined as $$K = P_p H' S^{-1} \quad \text{(Equation 2.6)}$$

Where S is described in Equation 2.11 and H is described in Equation 2.13.

The Measured State Error Covariance Matrix $P_m$ is defined as $$P_m = P_p - KHP_p \quad \text{(Equation 2.7)}$$

The Joseph form of this equation $$P_m = (P_p - KH)P_p(I-KH)' + KRK' \quad \text{(Equation 2.8)}$$

was not used because it was perceived to provide no additional benefit. The Joseph form ensures that the matrix will not go negative definite and will only create positive eigenvectors.

This form is popular for fixed point or low precision processors and was not deemed necessary in a Matlab implementation.

The last of the Measurement/Corrector Model equations is the Measurement State Matrix $$X_m = X_p + Kv \quad \text{(Equation 2.9)}$$

Where v, the measurement residual, is defined as $$v = z - f(X) \quad \text{(Equation 2.10)}$$

Given z is the current input measurement vector. The code (KalmanInnerLoop.m and KalmanIMMInner.m) uses fX to mean f(x).

As a note, if there is no discrepancy between the model's predicted measurement and the actual measurement, then the residual is zero.

Supporting Equations:
S is the Residual Error Covariance Matrix defined as:

$$S = HP_p H' + R \qquad \text{(Equation 2.11)}$$

The matrix R is defined as the Measurement Noise Error Covariance Matrix. R holds the variances ($\sigma^2$) (accuracy of the sensor) for each of the input measurements. In our case, the quality of the azimuth measurement may be as large as 0.9 degrees or as small as 0.05 degrees depending on the input source. Sensor measurement accuracy may change over time; therefore, it is assumed that the input preprocessors will output a variance for each data sample or block of samples. One of the benefits of the Kalman filter is the ability to "weight" the input data based on its perceived measurement quality (variances). As with many of the matrices in our algorithm, the dimension of the matrix is controlled by the number of input measurements. The value M_MEAS found in getParms.m is used in the code to control the number of measurements; this is user selectable in the MATLAB GUI (for the Kalman Quality Factor directory only).

$$R = \begin{bmatrix} (\sigma_{Az})^2 & 0 & 0 \\ 0 & (\sigma_{El})^2 & 0 \\ 0 & 0 & (\sigma_{Rg})^2 \end{bmatrix} \qquad \text{(Equation 2.12)}$$

The Measurement Transformation Matrix H is a Jacobian matrix used to transform from state space to measured space. Calculated in the routine getHare.m.

$$H = \begin{bmatrix} \frac{\partial Az}{\partial n} & 0 & \frac{\partial Az}{\partial e} & 0 & 0 & 0 \\ \frac{\partial El}{\partial n} & 0 & \frac{\partial El}{\partial e} & 0 & \frac{\partial El}{\partial d} & 0 \\ \frac{\partial Rn}{\partial n} & 0 & \frac{\partial Rn}{\partial e} & 0 & \frac{\partial Rn}{\partial d} & 0 \end{bmatrix} \qquad \text{(Equation 2.13)}$$

Where Az and El are radian angles and Range is in meters. The internal Kalman State values (n, e and d for north, east and down respectively) are in meters.

The first set of partials relates the Azimuth angle to the internal states [n ṅ e ė d ḋ] which are in meters and meters/second.

$$\frac{\partial Az}{\partial t} = \frac{-X_p(3)}{X_p(1)^2 + X_p(3)^2} \qquad \text{(Equations 2.14a, b)}$$

$$\frac{\partial Az}{\partial e} = \frac{X_p(1)}{X_p(1)^2 + X_p(3)^2}$$

The second set of partials relates the Elevation angle to the internal states listed previously.

The present invention provides for the innovative use of the interacting multiple model (IMM) Kalman filter-based algorithm in two stages. In the first stage, the system monitors the measurement residuals by processing measured MFA azimuth (and elevation when available) data over a set of candidate initial state vectors to weed out improbable geolocation solutions (and converge to the most likely) to effectively initialize the Kalman filter state vector. In stage 2 of the using the present invention, the system continues processing subsequent angled measurements in the two model IMM whereby the airborne target dynamics are modeled as (1) straight (i.e., constant speed and heading) and (2) undergoing a maneuver (i.e., heading change) over a brief period of time.

It is an object of this invention using only passive fighter RF multifunction aperture azimuth measurements along with fighter maneuvers to meet passive geolocation quality performance against an active airborne emitter.

It is another object of this invention to provide for geolocation estimating target state vector and error covariance including range, speed, heading, azimuth and elevation.

And yet another object of this invention is to use an interacting multiple model Kalman filter-based algorithm in order to meet passive geolocation quality performance against an active airborne emitter.

It is an object of this invention to provide a method and system in a tactical aircraft to greatly enhance passive range convergence in a real time incorporation of all available information regarding the target to rapidly initialize detection and tracks of the target.

It is another object of the invention to provide to the pilot and flight crews of tactical aircraft real time information and cues for early detection of airborne emitter targets and early track and range estimates using all available assets that ownship and remote sources can provide.

And yet another object of the invention is for rapid, accurate, passive range estimates for threat prioritization for a tactical fighter that utilizes total incorporation of the tactical fighter's information assets for a weapon system.

In accordance with these and other objects which will become apparent hereinafter, the instant invention will now be described with particular reference to the accompanying drawings.

PREFERRED EMBODIMENT OF THE INVENTION

In the preferred embodiment, the scenario would be a modern tactical fighter, which would be ownship, typically in conjunction with a second tactical fighter, which would be the wingman, operating in a military environment that would include mission resources from remote observation, which could be land-based or shipboard-based or airborne-based or a combination of all, that provides information independently and transfers that information into the tactical fighter mission system's function. The goal is to provide to the pilot of ownship the maximum amount of integrated tactical information that is used to rapidly, passively obtain range and track a maneuvering airborne target for interception to prevent airborne targets and emitters from reaching friendly forces and resources.

Figure 1:
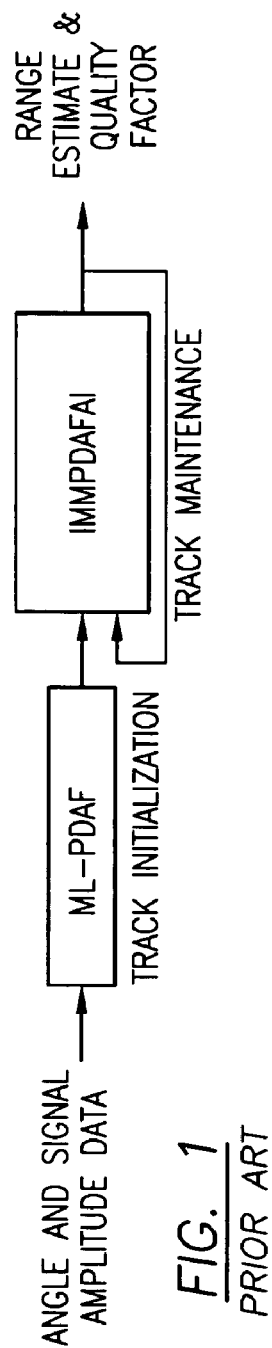
FIG. 1 shows a schematic diagram of a bearings only tracking of maneuvering targets using batch recursive estimators described in IEEE *Transactions On Aerospace And Electronic Systems*, Volume 37, No. 3, July 2001. This was shown in the prior art.

As discussed above, when shown in FIG. 1, the present invention utilizes batched base ML-PDAF and recursive IMM approach to a solution of the problem. The problem being solved by the methodology, algorithms and processes contained herein and described provide for the tactical fighter a passive multi-sensor and a priori information based airborne emitter (target location) process and algorithm.

Figure 2:
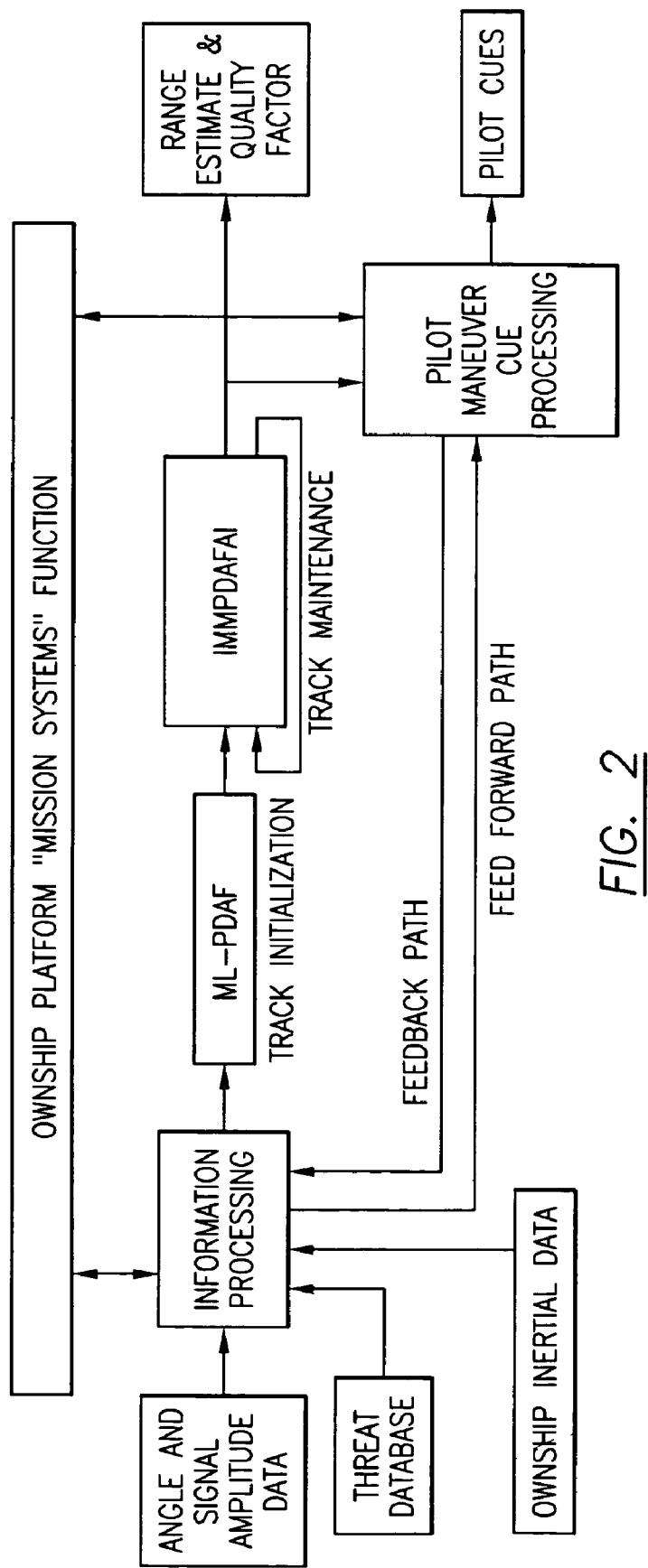
FIG. 2 shows a schematic diagram of the present invention.
Figure 3:
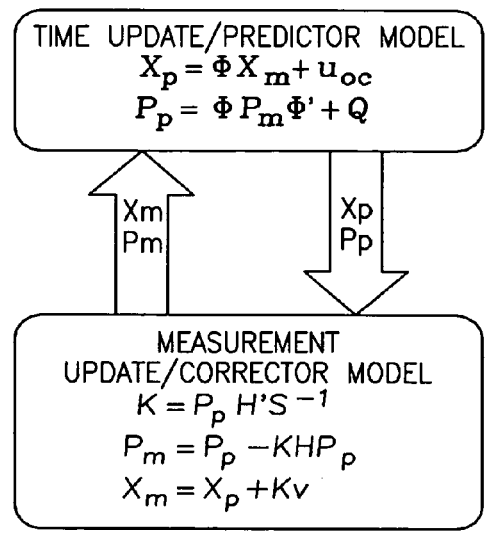
FIG. 3 shows a schematic diagram of an update predictor model and an update corrector model.

FIG. 2 shows the present invention that forms part of a tactical fighter platform mission system function, which would be on board ownship aircraft in conjunction with all the resources available at remote locations for feeding information to the ownship. The problem faced by the pilot in the cockpit is to obtain as quickly and early as possible the greatest range, target detection, and track initialization and track maintenance. This allows the ownship to intercept the target as far away from friendly sources as possible in the shortest amount of time or other requirements. Certainly the sooner the target is detected and a track is established, the faster the intercept problem can be determined, allowing for more reactive time by the pilot. The system shown in FIG. 2 shows that at the heart of the system is an information processing unit that talks back and forth between the mission system's platform. The information processing unit obtains ownship inertial data that includes speed, heading, RC contour map, infrared/EO contour map, flap motion tables, G-level, aperture locations, and banking concerning ownship. This information is also sent to the pilot cue analysis unit as part of the overall information provided to the pilot.

Of paramount importance, of course, is to get angle and signal amplitude data and threat database information into the information processing unit. This can also be supplemented by information from the tactical fighter mission system's platform from other resources that include target information, early warning information, and any other useful information that can be garnered by remote resources for use on ownship. It is very important also that the information processing unit have a feed forward path into the pilot cue analysis, and likewise, have a feedback path from the pilot cue analysis into the information processing unit for problem solution. The information processing unit incorporates multiple aircraft angle and RFPDW pulse with descriptor measurements via the IFDL intra/inter flight data link. This data is utilized for correlation of the angle information and to compute coarse estimates of range to the target from both wingmen, along with a computed accuracy value via a closed form two ship ranging expression. These ranging expressions are using the interferometer angle measurement accuracy, base leg separating the wingmen, and the angle measurements. It is very important that during this process the ownship can ask and request from the tactical fighter mission platform function any available range information that uses off board sources, including satellites or other platforms. This is an important source of data that can be utilized to solve the target problems through the information processing unit. The mission system's platform can also be used for incorporating better accuracy of on board IR infrared angle measurements and the amplitude data, which is correlated with the early warning RF measurements that feed the ML-PDAF shown in FIG. 2. This enhances convergence of the range estimates by using sub-milliradian measurement accuracy, along with the airborne target heading and velocity estimates. This is used as feed forward information to the pilot cue function. Obviously, pilot response in the movement of ownship is the final result and goal of the system to achieve the most efficient and successful intercept of the target.

The information processor provides for augmenting coarse range estimates which could be such as a range that goes "no further than," by using known threat airborne emitter RF mode transitions (e.g., acquisition to track), the ownship RCS presented to the emitter at the angle measured, the particular AI (airborne emitter) ratio of known range to the fourth root of a known RCS of the ownship.

As shown in FIG. 2, the information processor feeds the ML-PDAF emitter signals PDW SNR estimate to assist track formation and feed forward the SNR to the IMMPDAFAI connected as an output to the ML-PDAF. The IMMPDAFAI also includes information feedback concerning the track maintenance.

Ownship will include and store on board data files regarding enemy target platform identification information. This would be based on the typical targets that are to be anticipated that belong to the enemy. Also, user ownship would include other data concerning the target ID based on its radar systems or known weapon systems that may emit certain frequencies or fingerprints that might be expected for use in the target solution in the present invention. Other information that could be stored that would be very important is the lethal envelope and the tactical deployment to provide range inferencing, threat prioritization, and pilot cues. This information can be stored as shown in FIG. 2 in the threat database for providing to the information processing unit.

One of the important functions of the present invention is to use the information processing unit to modify IMM parameters based on a real time data and mission related information. Examples are adding activity to the model switching transition probabilities, the cue matrix process noise levels for each individual airborne target emitter platform dynamics model, the measurement air covariance R-matrix values, sample interval values used, the probability of detection parameter PD, the number of data points used in the batch ML, track initialization segment as shown in FIG. 2, and provide the tracks by extrapolating their position in inertial space and increasing their corresponding uncertainty when measurements are known to be unavailable as to ownship maneuvers that place the airborne emitter target outside the interferometer FOV (field of view) by feeding forward the FOV information to the IMMPDAFAI as shown in FIG. 2 where the Kalman filter banks are located.

As shown in FIG. 2, there is also a feed forward path from the information processing unit into the IMMPDAFAI. The output and interaction of the present system is shown that includes IMMPDAFAI outputs to the pilot cue analysis that provides range estimates and quality factors. The pilot cue analysis interacts with the overall tactical fighter mission system's platform functions.

The goal is to provide the fighter pilot the benefit of all information available to ownship with the result being to solve the problem of intercepting the target with as early detection as possible and with as early track initialization and track maintenance as possible to allow for more rapid problem solution for target interception and destruction. The information that is shown in FIG. 2 and the processing of all the information available to ownship results in providing for the pilot cue analysis whose job is to compute the airborne target heading and corresponding accuracy to determine if sufficient accuracy is available to present the pilot with the proper pilot cue options. These pilot cue options include ownship maneuver type, the G-level, initial ownship heading and, if applicable, two heading angles and straight leg duration for providing cues for ownship maneuvers. For use in the invention, ownship maneuvers include a two-turn maneuver and a sinusoidal flight path maneuver. The two-turn ownship maneuver would be two 90 degree turns in tandem in opposite directions, with the ownship flying on the same heading at the end of the maneuver. A second ownship maneuver would be the sinusoid with several variants. This would be defined by the algorithm to include two heading angles and two straight leg time values. With the first heading angle, the ownship will veer off its original course and then it will fly straight for a given amount of time. The second heading angle will turn the ownship in the opposite direction, crossing its original heading line, for a predetermined time value. If there is insufficient accuracy in the heading, feedback to the tactical fighter mission system's platform and the information processing unit will tell the system that more time is needed and that if another sensor asset can be assigned to aid heading accuracy, that the system should do so. These sensor assets can include off board resources that the mission system platform can request or make, even control. The closed loop architecture is another ingredient of the invention.

In the dynamic solution to the problem, ownship pilot will use all available information being processed through the information processing unit to track initialization and track maintenance and provide early on turns for enhancing the accuracy of the early target detection and track initialization through ownship's maneuvers. By bootstrapping different parts of the track initialization and track maintenance problem, it is believed that the present invention will initialize airborne tracks using varying degrees of real time and a priori information and the uncertainty of this information. This allows the method and system to quickly estimate airborne emitter headings using the real time interferometer and other sources of angle information from the target, angle measurements, and mission constraints to provide the ownship pilot maneuvering cues that will accelerate passive range convergence. The present invention also provides the pilot with range and range estimate quality values. Using the present invention, the system will maintain track when the airborne emitter maneuvers using angular measurements, pulse descriptor word data and inferences.

Air to Air Emitter Location Algorithm

Figure 4:
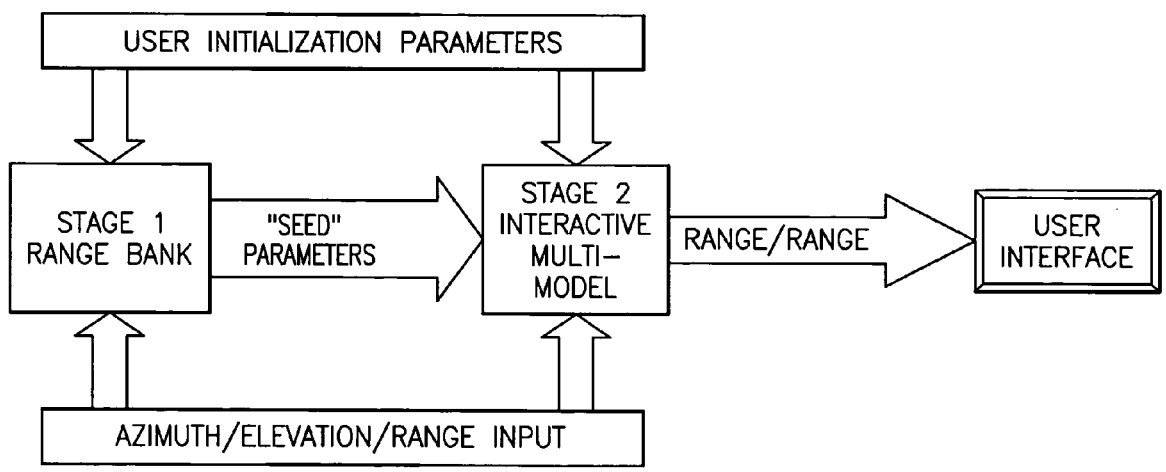
FIG. 4 shows an air to air emitter location algorithm as a schematic diagram.

The air to air emitter location algorithm uses a two stage approach to determine airborne emitter (target) range as shown in FIG. 4. There is user initialization parameters that are fed into stage one, the range bank and to stage two, the interactive multi-model. Azimuth elevation range inputs are also fed to the range bank in stage 1 and the interactive multi-model in stage 2. The output of stage 2 interactive multi-model is a range, range quality that goes to the user interface.

Compound Parallel Hypothesis Evaluator (Range Bank)

The first stage of the Air to Air Algorithm is a Range Bank (found in Matlab script KalmanPhase1.m). The Kalman Filter requires initial "estimates" or "seed" parameters for $P_m$ and $X_m$. These are necessary to perform the initial calculations $X_p$ and $P_p$ in the time update/predictor model described in Section 1 of this document. Analysis indicated that if the filter was "seeded" with a value close to the actual distance it performed much better than if it were "seeded" with a value substantially off of actual. High values of Q in the Kalman Filters with bad "seeds" did not significantly improve this issue. The problem is, of course, that the initial range is unknown. Therefore a bank of 12 Kalman Filters was used, each with a different range: 10 to 120 Nautical Miles in steps of 10 Nautical Miles (NMi). These banked filters are all run in parallel on identical data streams until enough information has been gathered such that a decision can be made as to which bank filter was seeded with the correct range. A critical step in this process is the determination of which bank filter is "correct". The averaged version of the residual v (equation 2.10) was used as the discriminator for this purpose. The bank element (a given range) with the lowest cumulative averaged residual is considered the most likely model.

$$v_{Range_{ave}} = \sum_{s=0}^{t} |v_{az}| \quad \text{(Equation 3.2)}$$

(see KalmanPhase1.m for more infromation)

The Measured Error and State Matrices ($P_m$ and $X_m$ respectively) from the "most likely/correct" model are used to seed Phase 2 the Interactive Multi-Model (IMM). The selection of this sampling point is critical. Making the decision before the ownship has made a maneuver would not be very useful. Making the decision too late could cause problems if the airborne emitter (target) started to maneuver. Additionally, one must assume the ownship pilot does not want to constantly be maneuvering. Currently the range bank runs for a predetermined amount of time before making the decision (programmed through the user GUI). The current philosophy is to wait for the first ownship maneuver to complete before transitioning from Phase 1 to Phase 2.

An enhancement was incorporated in the averaged residual algorithm, because, in some cases (high noise) a low value of $v_{Range_{ave}}$ occurred for an incorrect range seed. This was corrected by using a larger range bank with smaller spacing (10 NMi Vs 20 NMi) and "smoothing" over 3 adjacent ranges.

$$v_{Range_{ave}} = \sum_{r=n-1}^{n+1} \sum_{s=0}^{t} |V_{az}| \quad \text{(Equation 3.3)}$$

(see KalmanPhase1.m for more information)

where:
r=range bank number (from 1 to 12)
n=current range bank being evaluated (from 2 to 11)
s=sample offset into range residual data
t=current sample offset in range residual data (end of first maneuver in our testing)

Interactive Multi-Model (IMM)

The second stage uses the Measured/Corrected Error and State Matrices as mentioned above to "seed" the 2 Model Interactive Multi-Model (IMM). An IMM gives us the ability to use more than one set of Kalman Filter parameters concurrently. In our case, we use 2 Models, one tuned for a constant velocity, non-maneuvering emitter, and one tuned for a constant velocity maneuvering emitter. A third Model, one for an accelerating emitter was not included because there was some indication that the added benefit was not worth the increased complexity.

Figure 5:
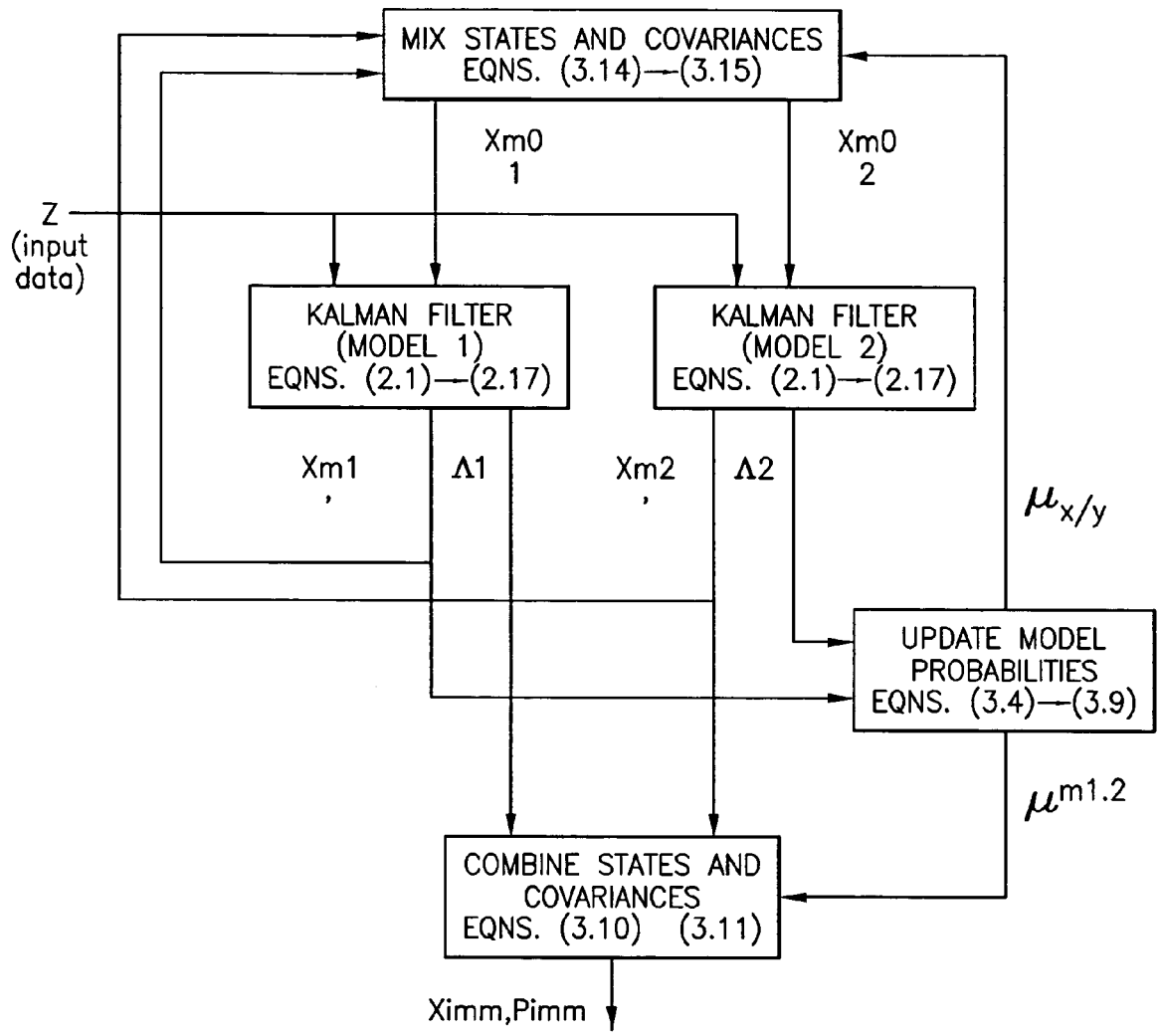
FIG. 5 shows the interaction between the individual models and their composite.

The strength of the IMM is the ability of the algorithm to use the likelihood of each of the models being correct as a weighting factor. These likelihoods can be either static or dynamic. We used a static likelihoods matrix as a starting point. FIG. 5 shown the interaction between the individual models and their composite.

As described above, the power of the IMM is in its ability to apply a likelihood function to the Kalman Filter running multiple models. The first likelihood needed by the IMM is the Model Likelihood FunctionΛ, which is computed for both models. (refer to KalmanIMMInner.m, variables L_Lo, and L_Hi for the Matlab implementation). Please note that variables will often times be referred to in two different ways, either with a 1 or 2, or with a Lo or Hi. The 1 or Lo connotation refers to the first Model in the IMM while the 2 or Hi connotation refers to the second Model in the IMM. The use of two different methods is because in MSWord it is believed to be clearer to write $X_{P1}$ as opposed to $X_{pLo}$. However, in the code, which is ASCII it was easier to put an _Lo in each of the variables.

$$\Lambda_1 \equiv L\_Lo = \frac{e^{-0.5 v_1^T S_1^{-1} v_1}}{\sqrt{2\pi \|S_1\|}}$$

$$\Lambda_2 \equiv L\_Hi = \frac{e^{-0.5 v_2^T S_2^{-1} v_2}}{\sqrt{2\pi \|S_2\|}}$$

(Equation 3.4a and b)

where $\|S_1\|$, $\|S_2\|$ are the determinants of Residual Error Covariance Matrices (Equation 2.11) for each of the models.

The Predicted Model Probabilities (A Priori) for each of the models are as follows:

$\mu_{p1} = Up\_Lo = \pi_{11}\mu_{m1} + \pi_{21}\mu_{m2}$ $\mu_{p2} = Up\_Hi = \pi_{12}\mu_{m1} + \pi_{22}\mu_{m2}$ (Equation 3.5a and b)

Where the values for $\mu_{xx}$ are part of the probability transition matrix $p_{ij}$ below.

$$p_{ij} = \begin{bmatrix} \pi_{11} & \pi_{12} \\ \pi_{21} & \pi_{22} \end{bmatrix}$$

(Equation 3.6)

Where:

$\pi_{12} \equiv p_{12} = T/T_{sd}$ $\pi_{11} \equiv p_{11} = 1 - \pi_{12}$ $\pi_{21} \equiv p_{21} = T/T_{td}$ $\pi_{22} \equiv p_{22} = 1 - \pi_{21}$ (p values are used in the program KalmanIMMInner.m)

Where T=the time period between samples and $T_{sd}$, $T_{td}$ are constants representing how long the emitter stays in a straight line and in a turn respectively. These values are constants, however, they could be made more dynamic depending on external information. For instance, if we have a priori knowledge from another sensor that the emitter has changed direction we could increase the probability that a transition could occur from model 1 to model 2 ($\pi_{12}$).

Given the probability of transitioning and the predicted model probabilities, we can calculate the mixing probabilities. The mixing probabilities are used to calculate the predicted states $X_{p1}$, $X_{p2}$ for the individual models (Equation 2.1) on the subsequent iteration. Mixing probabilities Umix(x,y) in the Matlab scripts read as probability of a transition x to y. Literally it is written as what is the probability that model x was the model (at time k−1) given model y is the current model (at time k).

$$\mu_{1/1} \equiv Umix(1,1) = \frac{\pi_{11}\mu_{m1}}{\mu_{p1}}$$

$$\mu_{1/2} \equiv Umix(1,2) = \frac{\pi_{11}\mu_{m1}}{\mu_{p2}}$$

$$\mu_{2/2} \equiv Umix(2,2) = \frac{\pi_{11}\mu_{m2}}{\mu_{p2}}$$

$$\mu_{2/1} \equiv Umix(2,1) = \frac{\pi_{11}\mu_{m2}}{\mu_{p1}}$$

(Equations 3.7a,b,c and d)

Where the values $\mu_1$ and $\mu_2$ are taken from the previous samples state information. Initially they must be "seeded". The scripts use $\mu_1$=0.9 and $\mu_2$=0.1 for the initial seed.

The individual measured model probabilities updates are each "updated" by the model likelihoods from Equations 3.4a and 3.4b and the mixing probabilities in equations 3.5a and 3.5b.

$$\mu_{m1} \equiv Um\_Lo = \frac{\mu_{p1}\Lambda_1}{c}$$

$$\mu_{m2} \equiv Um\_Hi = \frac{\mu_{p2}\Lambda_2}{c}$$

(Equation 3.8a and b)

Where c is a normalization constant defined as:

$c \equiv norm\_c = \mu_{m1}\Lambda_1 + \mu_{m2}\Lambda_2$ (Equation 3.9)

The IMM State is computed by applying the weights and model probabilities calculated above to the individual model outputs.

$X_{imm} \equiv Ximm = X_{m1}\mu_{m1} + X_{m2}\mu_{m2}$ (Equation 3.10)

The IMM Model Error Covariance Matrix is defined as $P_{imm} = \mu_{m1}[P_{m1} + (X_{m1} - X_{imm})(X_{m1} - X_{imm})'] + \mu_{m2}[P_{m2} + (X_{m2} - X_{imm})(X_{m2} - X_{imm})']$ (Equation 3.11)

The two equations above, the IMM State and IMM Model Error Covarience Matrix are the outputs of the Multi-Stage Parallel Interactive Multi-Model. The range of the emitter is taken from the IMM State. Simply:

$Range = \sqrt{X_{imm}(1)^2 + X_{imm}(3)^2 + X_{imm}(5)^2}$ (Equation 3.12)

Where the IMM State is defined as $X_{imm} \equiv [n \ \dot{n} \ e \ \dot{e} \ d \ \dot{d}]$ Finally, the confidence factor is computed (it is actually computed for Azimuth, Elevation and Range, but the Range is the only one of concern at this time).

$$SigRg = \sqrt{H_{Rg} P_{imm} H'_{Rg}}$$

$$= \sqrt{\begin{bmatrix} \frac{\partial Rg}{\partial n} \\ \frac{\partial Rg}{\partial e} \\ \frac{\partial Rg}{\partial d} \end{bmatrix} P_{imm} \begin{bmatrix} \frac{\partial Rg}{\partial n} & \frac{\partial Rg}{\partial e} & \frac{\partial Rg}{\partial d} \end{bmatrix}}$$

(Equation 3.12)

Where:

$$\frac{\partial Rg}{\partial n} = \frac{X_{imm}(1)}{\sqrt{X_{imm}(1)^2 + X_{imm}(3)^2 + X_{imm}(5)^2}}$$

$$\frac{\partial Rg}{\partial e} = \frac{X_{imm}(3)}{\sqrt{X_{imm}(1)^2 + X_{imm}(3)^2 + X_{imm}(5)^2}}$$

$$\frac{\partial Rg}{\partial d} = \frac{X_{imm}(5)}{\sqrt{X_{imm}(1)^2 + X_{imm}(3)^2 + X_{imm}(5)^2}}$$

(Equations 3.13a,b, and c)

Finally, the measured state update and Measured State Error Covariance Matrix $P_m$ and Measurement State Matrix $X_m$ must be updated for use in the next samples calculations. These equations differ from Equation 2.7 and 2.9. They differ in that the Measured Matrices $P_m$ and $X_m$ now factor in the mixing probabilities calculated in Equations 3.7a–d. The IMM equations for $P_m$ and $X_m$ are:

$$X_{m01} = X_{m1}\mu_{1|1} + X_{m2}\mu_{2|1}$$

$$X_{m02} = X_{m1}\mu_{1|2} + X_{m2}\mu_{2|2}$$

(Equations 3.14a and b)

$$P_{m01} = \mu_{1|1}\{P_{m1} + [X_{m1} - X_{m01}][X_{m1} - X_{m01}]^T\} + \mu_{2|1}\{P_{m2} + [X_{m2} - X_{m01}][X_{m2} - X_{m01}]^T\}$$

$$P_{m02} = \mu_{1|2}\{P_{m1} + [X_{m1} - X_{m02}][X_{m1} - X_{m02}]^T\} + \mu_{2|2}\{P_{m2} + [X_{m2} - X_{m02}][X_{m2} - X_{m02}]^T\}$$

(Equations 3.15a and b)

The change in notation from $X_m$ and $P_m$ to $X_{m0}$ and $P_{m0}$ is to signify that these results are to be used by the next sample set not the current one.

Confidence Factor

Initial testing has indicated that a limit can be set, using SigRg, which would encompass the emitter's truth range for a majority of the time. This limit probably lies in the 3 to 5 times SigRg area.

The result of the invention is to rapidly, passively range track maneuvering airborne emitters (targets and threats) for tactical fighters by providing a new approach to the batch base recursive approach.

In summary, the advantages of the improved method and system for tactical fighter aircraft is that it works in conjunction with the tactical aircraft pilot to provide the pilot an indication as to "turn left" or "turn right" to speed convergence on geolocation performance, performs track initialization by use of a stage one to analysis the measurement residuals and rule out improbable initial target emitter range and heading, it makes best use of the IMM to track both targets that are constant speed and heading as well as targets that undergo heading changes, and provides a real time range estimate "quality factor" to be used by the tactical fighter aircraft pilot. The system and the method use the interacting multiple model (IMM) Kalman filter-based algorithm in two separate stages.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method to rapidly, passively range and track maneuvering airborne emitters for tactical fighters that includes batch based maximum likelihood probabilistic data association for track initialization and interacting multiple model estimators for track maintenance, comprising the steps of:
   providing track initialization by providing and including an ML-PDAF filter;
   providing track maintenance using interacting multiple model PDAF with amplitude information;
   providing information processing connected to the input of said track initialization filter, which includes threat database information, angle and signal amplitude data, and ownship inertial data;
   providing pilot cue analysis to the pilot of said tactical fighter that includes pilot cues for turning for more rapid problem solving;
   providing emitter airborne track information; and
   maintaining track whenever the airborne emitter target or threat maneuvers using angle measurements.

2. A method to rapidly, passably range and track maneuvering airborne emitters (targets) for tactical fighters to meet passive geolocation quality performance against an active airborne emitter (target) using only the tactic fighter passive RF multifunction aperture (MFA) azimuth measurements along with prescribed tactical fighter maneuvers wherein geolocation involves estimating target state vector and error covariance including range, speed, heading, azimuth and elevation comprising the steps of:
   providing track initialization by providing and including an ML-PDAF filter;
   providing track maintenance using interacting multiple model PDAF with amplitude information;
   providing information processing connected to the input of said track. initialization filter, which includes threat database information, angle and signal amplitude data, and ownship inertial data;
   providing pilot cue analysis to the pilot of said tactical fighter that includes pilot cues for turning for more rapid problem solving;
   providing emitter airborne track information;
   maintaining track whenever the airborne emitter target or threat maneuvers using angle measurements;
   providing a Kalman filter-based algorithm that includes a first stage and a second stage;
   providing in said first stage of said Kalman filter-based algorithm for monitoring the measurement residuals by processing measured MFA azimuth data over a set of candidate initial state vectors to weed out improbable geolocation solutions and converge to the most likely to effectively initialize the Kalman filter state vector; and
   providing a second stage that continues processing subsequent angled measurements in the two model interacting multiple models whereby the airborne target dynamics are modeled as (1) straight which include constant speed and heading; and (2) undergoing a maneuver including a heading change over a brief period of time.

* * * * *